United States Patent [19]
Murai et al.

[11] 3,964,754
[45] June 22, 1976

[54] DEVICE FOR SEALING THE END OF SHEATH PIPE

[75] Inventors: Masayo Murai, Kawasaki; Hiroki Monno, Tokyo, both of Japan

[73] Assignee: Nishiyama Gomu Kabushiki Kaisha, Tokyo, Japan

[22] Filed: May 19, 1975

[21] Appl. No.: 578,992

[52] U.S. Cl. ............................... 277/101; 277/166; 277/123; 138/108
[51] Int. Cl.² ...................... F16L 21/04; F16J 15/00
[58] Field of Search ........ 277/101, 166, 63, DIG. 2, 277/123; 285/133 R, 340, 346; 138/108, 112, 113, 148

[56] References Cited
UNITED STATES PATENTS

| | | |
|---|---|---|
| 511,734 | 12/1893 | Hoffstadt ........................ 277/123 X |
| 2,258,135 | 10/1941 | Curtis ............................ 277/101 X |
| 2,720,267 | 10/1955 | Brown............................ 277/123 X |
| 3,270,610 | 9/1966 | Knowlton.......................... 138/96 R |

*Primary Examiner*—Samuel B. Rothberg

[57] ABSTRACT

Device for sealing the end of a sheath pipe that protects a main pipe therein, comprising a pair of sealing rings arranged in face-to-face relation, a pair of flanges oppositely placed at the outside of said sealing rings, all these sealing rings and flanges being tightened with bolts into a unit, each sealing ring being made of flexibly elastic material having a cup shape cross section.

2 Claims, 8 Drawing Figures

U.S. Patent  June 22, 1976  3,964,754
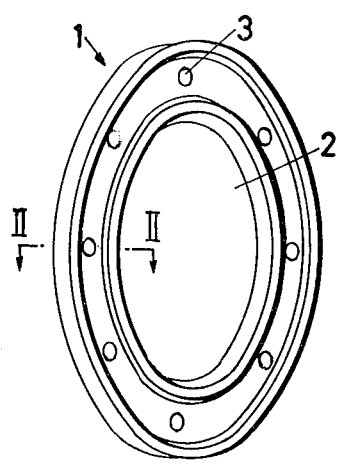
FIG. 1
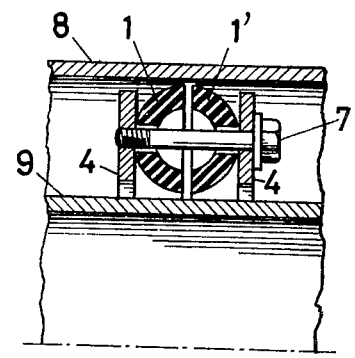
FIG. 2
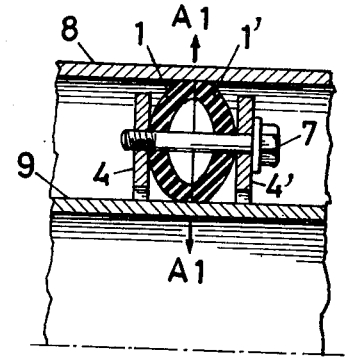
FIG. 4
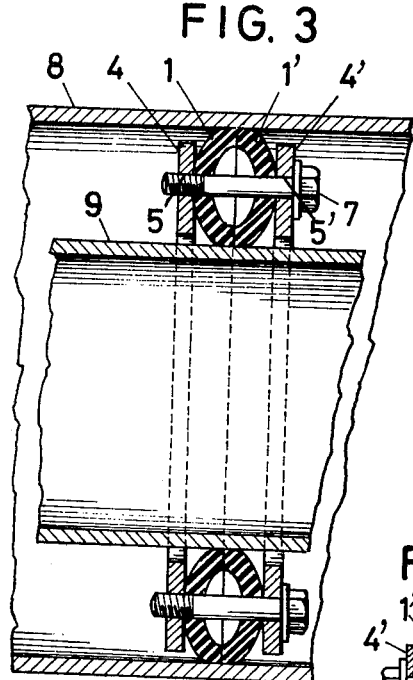
FIG. 3
FIG. 5
FIG. 6
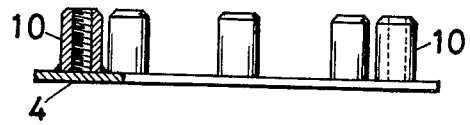
FIG. 8
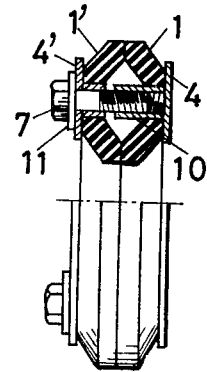
FIG. 7
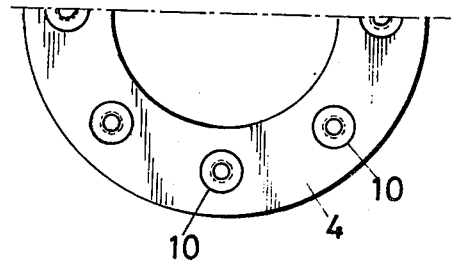

DEVICE FOR SEALING THE END OF SHEATH PIPE

This invention relates to a device for sealing the end of a sheath pipe that encloses a main pipe for gas, water or any other fluid.

When a gas pipe, waer supply pipe or the like is laid underground in a soft formation, in a river, under a road where traffic is busy or under a rail road, it is necessary to protect the pipe. In such case, a sheath pipe of steel or other suitable material is first laid and then a main pipe is inserted thereinto. However after the main pipe is inserted into the sheath pipe, the end of the sheath pipe should be sealed completely to prevent entering of sand, mud or water therein.

Heretofore, for sealing the end of such sheath pipe, aphalt or vulcanized rubber was filled into it. That method is very troublesome because a mold frame should be prepared at the pipe end to pour semi-liquid sealing material therein. Yet there is difficulty in that such sealing material is not fully and uniformly filled in the frame and also it tends to damage the coating of the main pipe with the heat of the filling material.

One object of the present invention is to eliminate the defects of the conventional sealing means and furnish an improved device for completely sealing the void between a sheath pipe and a main pipe to prevent the flowing of sand, mud, water and any other foreign matter thereinto.

Another object of the present invention is to secure a main pipe along the central axial line of the sheath pipe.

Still another object of the present invention is to isolate the main pipe from vibration and electric current that may be delivered to the sheath pipe.

A further object of the present invention is to furnish a sealing device that is easily applied between the sheath pipe and main pipe.

A still further object of the present invention is to furnish a sealing device that will prevent water from penetrating the gap between the bolt and flange.

To achieve these objects, the sealing device of the present invention is constructed with a pair of sealing rings made of elastic material having a cup shape cross section, placed in face-to-face relation, and at the outside of these sealing rings, a pair of flanges are oppositely placed and with bolts all these sealing rings and flanges are tightened to form a unit.

FIG. 1 is a perspective view of a sealing ring of the present invention.

FIG. 2 is a cross section view of the sealing ring taken along the line II—II in FIG. 1. bolts.

FIG. 3 is a sectional view of the sealing device applied between a sheath pipe and a main pipe.

FIG. 4 is a section view of a part of the sealing device showing the state before tightening of its bolts.

FIG. 5 is a section view of a part of the sealing device showing the state after tightening of its bolts.

FIG. 6 is a section view of another type of a sealing flange.

FIG. 7 is a plan view of the device shown in FIG. 6.

FIG. 8 is a cross section view of the assembled sealing device shown in FIG. 6 and FIG. 7.

Now one embodiment of this invention is described with reference to the accompanying drawings.

In FIGS. 1–3, there is shown one embodiment of the present invention in which sealing rings 1, 1'' are made of flexibly elastic material such as synthetic rubber, each having a cup shape cross section and a centrally formed opening 2 through which a main pipe passes. A plurality of bolt holes 3 through each sealing ring 1, 1' are centered on a circle concentric to it, in spaced apart relation to one another. Flanges 4, 4' have also a plurality of bolt holes 5, 5' respectively. The bolt holes 5 of one flange 4 are threaded with a tap.

The sealing rings 1, 1' are abutted together in face-to-face relation with their openings 6 aligned. The flanges 4, 4 are placed oppositely at the outside of the sealing rings 1, 1' and all these rings and flanges are tightened with a plurality of bolts 7 to form a unit.

In FIG. 3, there is shown the state of use of the sealing device of the present invention. A main pipe 9 is passed through a sheath pipe 8, and the sealing device is applied. As shown in FIG. 4, since there is a gap between the sealing rings 1, 1' and the main pipe 9 and also between the sealing rings and the sheath pipe 8, the sealing device of the present invention can be easily inserted therebetween. As shown in FIG. 5, when the bolts 7 are fully tightened, the sealing rings 1, 1' are extended in radial directions A1, A1, thereby the outer and inner of the sealing rings 1, 1' closely contact the inner face of the sheath pipe 8 and the outer face of the main pipe 9 respectively.

Thus with tightening of the bolts 7, the space between the sheath pipe 8 and main pipe 9 is completely sealed to prevent entering of mud, sand and wwater. Further, as the sealing rings 1, 1' are made of soft material, they isolate the main pipe from vibrations, thus preventing damage to the main pipe 9 even though they securely fix it axially in the center of the sheath pipe 8.

Another embodiment of flange 4 is shown in FIG. 6 and FIG. 7. One flange 4 has on its one side a plurality of threaded sleeves 10 that are 10 weldedly attached to it, and the other flange 4' has a corresponding number of holes. As shown in FIG. 8, the sealing rings 1 and 1' are abutted together with their openings 6 (FIG. 2) aligned. Flanges 1, 1' are placed oppositely at the outside of the sealing rings 1, 1'. With bolts 7, the sealing rings and flanges are tightened iinto a unit. The end of each bolt 7 is threaded into the sleeve 10. In FIG. 8, 11 is a washer. Since the bolts are received in the internally threaded sleeves 10 of the flange 4, there is no leakage between the bolts and flanges, thus sealing is completely made.

By adjusting the length of bolts 7 and sleeves, over-tightening of sealing rings can be avoided.

What is claimed is:

1. Sealing means whereby a main pipe can be concentrically supported inside a sheath pipe that has an inside diameter substantially larger than the outside diameter of the main pipe, and whereby the main pipe is protected against vibration and the like imparted to the sheath pipe and entry of foreign matter into the space between the pipes is prevented, said sealing means comprising:
   A. a pair of annular sealing elements of resiliently yieldable material, each of said sealing elements
      1. being substantially cup-shaped in cross section to have
         a. a concave surface that faces in one axial direction and terminates at substantially coplanar inner and outer edges of the sealing element and
         b. a convex surface that faces in the opposite direction, 2. each sealing element when in relaxed condition having
  a. an inside diameter to loosely fit around a main pipe and
  b. an outside diameter to loosely fit inside a sheath pipe, and
3. each sealing element having a plurality of circumferentially spaced bolt holes therethrough, the bolt holes in the two sealing elements being located to align with one another when said sealing elements are concentrically disposed with their concave surfaces facing one another;
B. a pair of annular flange members of substantially rigid material, each of said flange members having
  1. an inside diameter at least as large as the inside diameter of the sealing elements,
  2. an outside diameter no larger than the outside diameter of the sealing elements, and
  3. bolt holes therethrough arranged to align with the bolt holes in the sealing elements when the flange member is disposed in concentric relation to the sealing elements;
C. threaded means on one of said flange members cooperable with bolts received in its bolt holes; and
D. a plurality of bolts, each extending through aligned bolt holes in both flange members and both sealing elements and holding them in concentric relation with said inner and outer edges on the two sealing elements respectively engaging one another and with the flange members overlying the opposite convex surfaces of the sealing elements, said bolts
  1. having threaded shanks engaged with said thread means on said one flange member and
  2. having heads overlying the other flange member so that tightening of said bolts resiliently deforms the sealing elements in axial compression and thus expands them radially inwardly and outwardly.

2. The sealing means of claim 1, further characterized by:
E. a plurality of sleeves secured to one of said flange members, one for each bolt hole therein, each sleeve being secured to the flange member concentrically with its bolt hole and having an inside diameter such that one of the bolts can extend therethrough with a close fit, said sleeves being closely receivable in the bolt holes in the sealing element adjacent to the last mentioned flange member and projecting axially from that flange member towards the other one to cooperate with the latter in limiting the amount of axial compressive force that can be applied to the sealing elements by means of the bolts.

* * * * *